Feb. 10, 1970    V. R. HUBER    3,494,403
TIRE

Original Filed May 23, 1967    2 Sheets-Sheet 2

INVENTOR.
VICTOR R. HUBER
ATTY.

United States Patent Office 3,494,403
Patented Feb. 10, 1970

3,494,403
TIRE
Victor R. Huber, Akron, Ohio, assignor to The B. F. Goodrich Company, New York, N.Y., a corporation of New York
Original application May 23, 1967, Ser. No. 640,688. Divided and this application Apr. 8, 1969, Ser. No. 814,242
Int. Cl. B60c 29/00
U.S. Cl. 152—339                                  9 Claims

ABSTRACT OF THE DISCLOSURE

A safety tire having an inner compartmental tire mounted in an outer tire with a valve operative to provide selective gauging, deflation or pressurization of the respective chambers defined by the outer tire, inner compartmental tire and the rim.

CROSS REFERENCE TO RELATED APPLICATIONS

This application is a division of copending application Ser. No. 640,688 filed May 23, 1967.

BACKGROUND OF THE INVENTION

This invention relates to a tire and more particularly to a safety tire having an inner tire mounted in an outer tire to provide a compartmental safety tire and cooperative with a valve that provides selective inflation or deflation of the separate chambers formed by the outer tire, inner tire, and the rim which receives such tires.

In dual chamber tires where the chambers are structurally separate, it is advantageous to provide a single valve means through which it is possible to inflate, deflate and gauge such chambers separately. Separate valves have been used for the separate inner and outer tires; however, such means is expensive and impractical as it requires special rims and accessories. Others have proposed to use a valve structure that has two separate air valves operating through two separate air passages; however, in view of the standardization in the industry, a redesign of the rim to accommodate such change would be impractical.

To provide a solution to the above problems, the present invention provides chambered or plural compartmental tire having a valve that is economical to manufacture, simple and useable on the ordinary conventional rim whether such be standard passenger, airplane or truck rim, facilitating the gauging, inflating and deflating of the respective chambers quickly and without difficulty. No special tools are necessary to operate such valve structure, and there is no leakage between chambers through such valve structure. Such valve is adaptable for use with a multi-chambered member which requires positive individual control of the respective chambers.

BRIEF SUMMARY OF THE INVENTION

The present invention is directed to a valve that has a plurality of control valves cooperative with a control element that selectively conditions the appropriate control valve for communicating the control presure chamber with an appropriate chamber to be pressurized.

Figure 1:
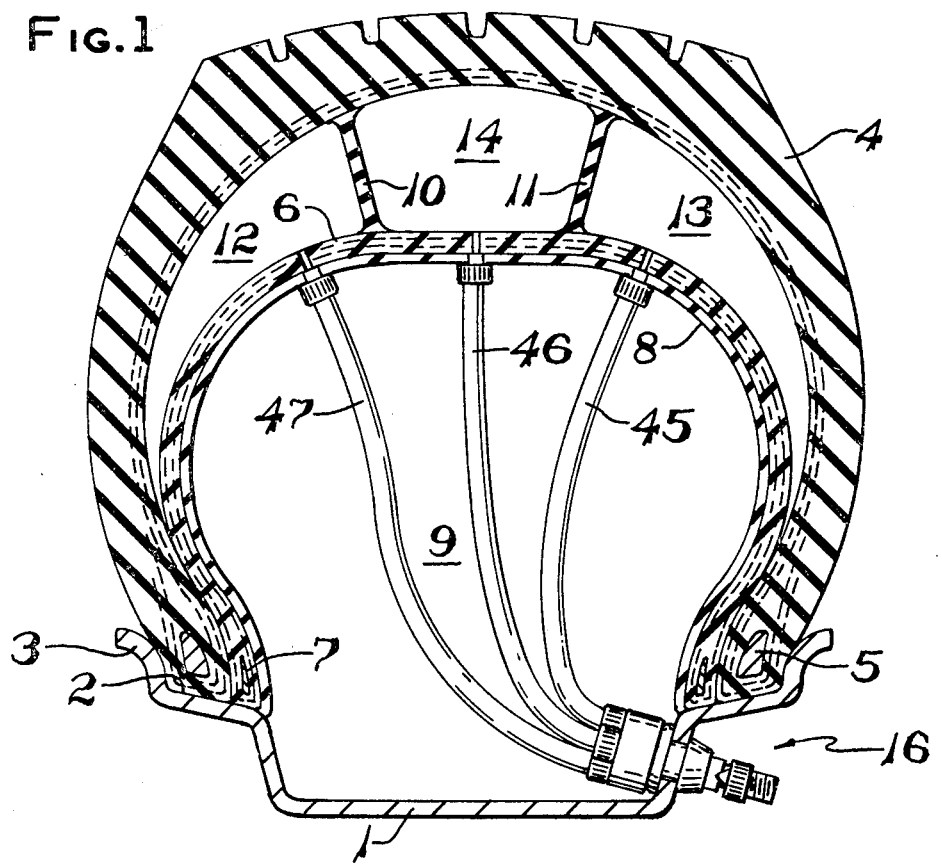
FIG. 1 is a cross-sectional view of a safety tire embodying the invention.

Referring to the drawings and more particularly to FIG. 1 there is shown a tire rim 1 having spaced bead seats 2 with retaining flanges 3 adjacent thereto. A tubeless outer tire 4 having bead 5 is mounted on the rim 1. An inner tire 6 having beads 7 and rubberized reinforced material such as fabric extending therethrough has the edges thereof seated adjacent to the respective edges of the outer tire 4 on the bead seats 2. A butyl liner 8 is formed with the inner tire 6 which in cooperation with the rim 1 defines an inner chamber 9. Located between the inner tire 6 and the outer tire 4 are a pair of spaced circumferentially extending liners 10 and 11 respectively. Liner 10 cooperates with the inner tire 6 and the outer tire 4 to define an annular circumferentially extending chamber 12 while liner 11 cooperates with inner tire 6 and the outer tire 4 to define an annular circumferentially extending chamber 13. Liners 10 and 11 cooperate with the outer tire 4 and the inner tire 6 to define a central circumferentially extending annular chamber 14.

A tire valve 16 is adopted to be mounted to the tire rim 1 of such chambered tire. Tire valve 16 has an outer longitudinally extending tubular valve body 17 which has its intermediate portion encased within a rubberized seal 18. Seal 18 is conically shaped with an annular recessed portion 19 which receives and sealingly engages the standard rim 1 as shown in FIG. 1. Valve body 17 has a central bore extending longitudinally therethrough and with the one end portion thereof terminating into an enlarged hub portion 20, which portion 20 cooperates with an annular plate 21 to define a chamber 22. Axially movable within the central bore of valve body 17 is a control valve member 25 which has an enlarged portion at its forwardmost end portion as at 26 to limit the axial movement of such control valve member 25 into the central bore of valve body 17. The other end portion of control valve member 25 threadedly receives an annular flange 27 which provides a seat for a spring 28 which biases valve member 25 inwardly (leftwardly as viewed in FIG. 2). Annular flange 27 has a projection 30 which extends in an axial direction for a purpose to be described. The peripheral wall of the central bore of valve body 17 is suitably recessed to receive an O-ring seal 31 which abuttingly contacts the outer peripheral surface of the control valve member 25 to prevent the passage of fluid thereby. Control valve member 25 has a central passageway 32 extending therethrough. Threadedly mounted in the one end portion of the central passageway 32 of valve member 25 is a valve core 33 with an outwardly extending stem 34, which stem 34 is adapted to be depressed by contact with the pin of an inflating nozzle 55 for pressurizing such central passage 32 of valve member 25. Annular plate 21 has a plurality of threaded bores 35 which are located substantially 90° from each other relative to the center of such plate 21 to receive nipples 36 which in turn receives conventional valve cores 37, 38, 39 and 40 having stems 41, 42, 43 and 44 respectively projecting outwardly into chamber 22. Such stems 41–44 are adapted to be selectively depressed by the axially extending projection 30 of valve member 25. The nipples 36 are connected to chambers 9, 12, 13 and 14 respectively of the safety tire such that the respective chambers can be separately inflated, gauged and deflated to thereby provide a safety tire having added features of safety. Valve core 37 is adapted to control the inflation or deflation of chamber 13 via hose 45, valve core 38 controls the inflation and deflation of chamber 14 via hose 46, valve core 39 controls the inflation and deflation of chamber 12 via hose 47, while valve core 40 controls the inflation and deflation of chamber 9 directly through nipple 36. Four valve members directed to the control of a compartmental tire are disclosed as an example only although a three-chambered or compartmental tire is within the scope of this disclosure. Such chambers or compartments may be associated with devices other than tires wherein it is desired to separately control through a simple inexpensive valve the inflation and deflation of a plurality of chambers. To assure proper alignment of the projection 30 and the respective stems 41 through 44 respectively, the outer end portion of valve member 25 has a projection 50 which is adapted to selectively engage V-shaped notches 51, 52, 53 or 54 on the other end portion of valve body 17, as shown in FIG. 3. Such notches 51–54 inclusive are located 90° apart in alignment with the respective stems 41–44.

Figure 2:
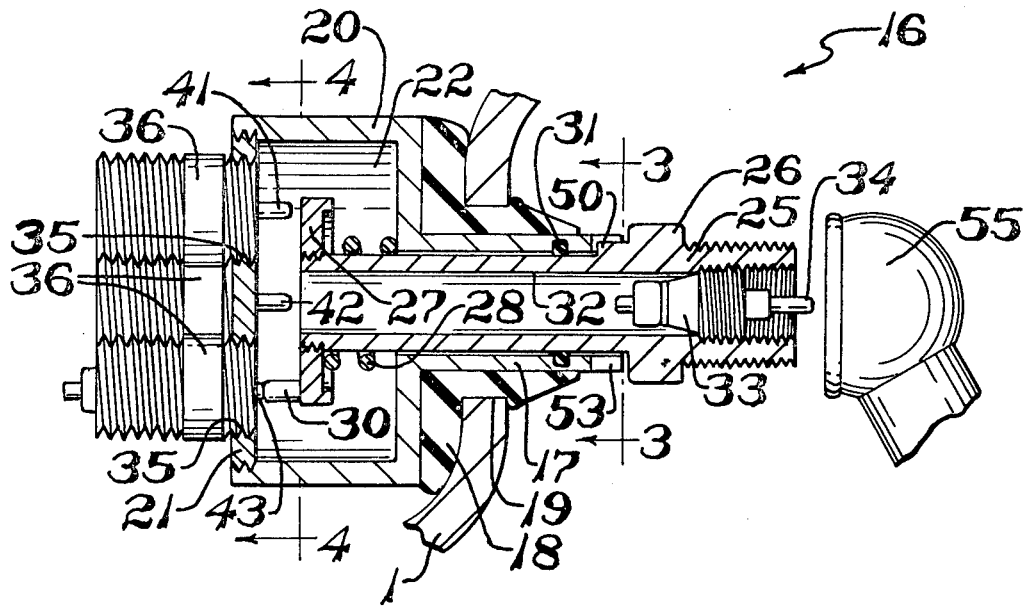
FIG. 2 is a cross-sectional view of a tire valve.
Figure 3:
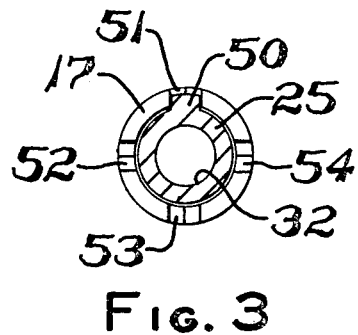
FIG. 3 is an end view of the valve body taken along line 3—3 of FIG. 2.
Figure 4:
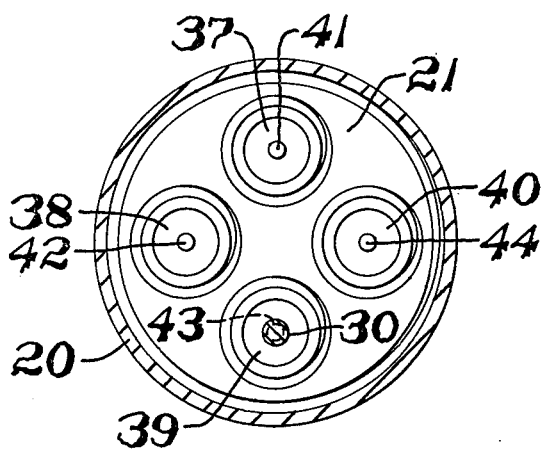
FIG. 4 is a cross-sectional view of the tire valve taken along line 4—4 of FIG. 2.

In the operation of the tire valve as shown in FIGS. 1 through 4, valve member 25 is axially moved (in a rightward direction as viewed in FIG. 2) relative to the valve body 17 such that the projection 50 clears the outer edge portion of valve body 17 to permit the relative rotation therebetween such that the projection 50 may register selectively with one of the V-shaped notches. After selection of the proper notch, the valve member 25 is rotated and released so that the projection 50 will register with the selected notch so that upon release of the valve member 25, spring 28 biases such valve member 25 inwardly causing projection 30 to depress the proper stem, which in the example shown in FIG. 2 is stem 43 of a standard valve core thereby opening communication between the chamber 22 and chamber 12 via the valve core and hose 47 cooperating with such stem 43. An inflating nozzle 55 depressing valve stem 34 is adapted to pressurize the central passageway 32 of valve member 25 along with chamber 22 and chamber 12. The other chambers 9, 13 and 14 may be inflated in a similar manner through selective axial movement and rotation of the valve member 25 with the selective depressing of the stem associated with the selective chambers desired to be inflated. The respective notches 51–54 may be coded to provide the operator with information as to which chamber is being inflated.

Various modifications are contemplated and may obviously be resorted to by those skilled in the art without departing from the spirit and scope of the invention, as hereinafter defined by the appended claims, as only preferred embodiments thereof have been disclosed.

I claim:

1. A safety tire for mounting on a rim, said tire having a plurality of outer annular compartments, said tire cooperative with said rim to define an annular inner compartment, a tire valve mounted in said rim extending therethrough, said tire valve having a plurality of valve cores mounted thereon, one of said valve cores communicating directly with said inner compartment, the other of said valve cores communicating via individual hoses to said outer annular compartments to control the respective inflations and deflations of said individual outer annular compartments, a control member movably mounted in said tire valve, a cam mounted on said control member operable to selectively actuate one of said valve cores, a standard valve core member mounted in said control member operative upon actuation to selectively inflate or deflate one of said compartments in accordance with the actuation of a corresponding valve core by said cam.

2. A safety tire as set forth in claim 1 wherein said tire valve has a central chamber communicating, said control member having a central passageway communicating said standard valve core member with said central chamber, said control members having biasing means moving said cam into abutting engagement with one of said valve cores for actuation thereof to communicate said central chamber with said compartment associated with said actuated valve core.

3. A safety tire as set forth in claim 2 wherein said cam of said control member comprises a projection operable to selectively depress and actuate one of said valve cores.

4. A safety tire as set forth in claim 2 wherein said control member has an abutment, said tire valve having a plurality of grooves for selective cooperation with said abutment to align said cam with one of said valve cores.

5. A safety tire for mounting on a rim, said tire having a pair of outer annular compartments, said tire cooperative with said rim to define an annular inner compartment, a tire valve mounted in said rim extending longitudinally therethrough, said tire valve having a plurality of valve cores mounted in one end thereof, one of said valve cores communicating directly with said inner compartment, the other of said valve cores communicating with said pair of annular compartments via individual hoses to control the respective inflation and deflation thereof, a control member movably mounted in said tire valve, said control member having cam means operable to selectively actuate one of said valve cores, the standard valve core member mounted in one end of said control member operative upon actuation to selectively inflate and deflate one of said compartments in accordance with the actuation of a corresponding valve core by said cam means.

6. A member having a plurality of compartments adapted to be inflated, a valve body attached to said inflatable member and extending therein, one end portion of said valve body being enlarged, a plug member mounted on said enlarged end portion and cooperative therewith to define a chamber, said plug member having a plurality of bores extending therethrough, a nipple mounted on each of said bores, each nipple having a valve core mounted therein with a valve stem projecting therefrom into said chamber, a movable tubular valve member mounted in the central bore of said valve body, one end portion of said valve member having a valve core mounted therein and being operative to inflate and deflate said chamber, cam means on the other end of said valve member operative to selectively actuate said valve stems upon movement of said valve member.

7. An inflatable device as set forth in claim 6 wherein said valve member has means biasing said valve member in an axial direction towards said plug wherein said cam means is operative to actuate one of said valve stems.

8. An inflatable device as set forth in claim 7 wherein said movable member is journaled in said valve body for axial and rotatable movement therein; and said valve stems extend in an axial direction parallel to the longitudinal center line of the central passageway of said valve member, and said cam means having a projection on said valve member operative to selectively actuate said valve stems.

9. An inflatable device as set forth in claim 8 wherein said valve stem has a projection mounted therein cooperative with a plurality of recesses on said valve body to selectively locate said valve member relative to said valve body.

References Cited

UNITED STATES PATENTS

| 2,196,814 | 4/1940 | McClay | 152—339 |
| 2,955,636 | 10/1960 | Gray | 152—340 |
| 3,065,763 | 11/1962 | Howard | 152—340 |
| 3,329,193 | 7/1967 | Mosebach | 152—340 |

ARTHUR L. LA POINT, Primary Examiner

C. B. LYON, Assistant Examiner

U.S. Cl. X.R.

137—635; 152—427